US012179334B2

(12) United States Patent
Chuang

(10) Patent No.: US 12,179,334 B2
(45) Date of Patent: Dec. 31, 2024

(54) TOOL STORAGE DEVICE

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 0 days.

(21) Appl. No.: 18/324,310

(22) Filed: May 26, 2023

(65) Prior Publication Data

US 2024/0391088 A1 Nov. 28, 2024

(51) Int. Cl.

| | |
|---|---|
| ***B25H 3/02*** | (2006.01) |
| ***B65D 1/10*** | (2006.01) |
| ***B65D 21/02*** | (2006.01) |
| ***B65D 25/10*** | (2006.01) |
| ***B65D 41/04*** | (2006.01) |
| ***B65D 51/28*** | (2006.01) |
| *B25H 3/00* | (2006.01) |

(52) U.S. Cl.

CPC ................. *B25H 3/02* (2013.01); *B65D 1/10* (2013.01); *B65D 21/0228* (2013.01); *B65D 25/108* (2013.01); *B65D 41/04* (2013.01); *B65D 51/28* (2013.01); *B25H 3/003* (2013.01); *B25H 3/006* (2013.01)

(58) Field of Classification Search

CPC .......... B65D 14/04; B65D 51/28; B65D 1/10; B25H 3/006

USPC .......................................................... 206/373

See application file for complete search history.

(56) References Cited

U.S. PATENT DOCUMENTS

| | | | | | |
|---|---|---|---|---|---|
| 2,627,276 | A | * | 2/1953 | Eggleton ................ | G04D 3/083 215/390 |
| 3,072,244 | A | * | 1/1963 | Smith .................... | B65D 83/02 206/379 |
| 4,533,044 | A | * | 8/1985 | Ban ........................ | A46B 17/06 206/362 |
| 5,271,520 | A | * | 12/1993 | McAfee .................... | B01L 9/06 206/315.11 |
| 5,350,065 | A | * | 9/1994 | Darrey ..................... | B25H 3/00 220/735 |
| 5,379,885 | A | * | 1/1995 | Chen ........................ | B25H 3/04 211/163 |
| 5,435,979 | A | * | 7/1995 | Miller ...................... | A61C 3/04 211/60.1 |
| 5,441,163 | A | * | 8/1995 | Carrasco .................. | B25H 3/06 220/822 |

(Continued)

FOREIGN PATENT DOCUMENTS

| | | |
|---|---|---|
| CN | 212351962 U | 1/2021 |
| CN | 214980954 U | 12/2021 |

(Continued)

*Primary Examiner* — Ernesto A Grano

(74) *Attorney, Agent, or Firm* — Muncy, Geissler, Olds & Lowe, P.C.

(57) ABSTRACT

A tool storage receive includes a container and a tool rack. The container includes a jar defining a first receiving portion therein and including a first opening intercommunicating the first receiving portion with the outside. The tool rack includes a base on an end thereof and a tool hanger rack on another end thereof. The base is disengageably mounted to the first opening. The tool hanger rack is received in the first receiving portion. When the base is disengaged from the first opening, the tool hanger rack is removable out of the first receiving portion. Thus, the tool storage device can properly receive tools by the above structure.

6 Claims, 5 Drawing Sheets

(56) References Cited

U.S. PATENT DOCUMENTS

| | | | | | |
|---|---|---|---|---|---|
| 5,512,165 | A * | 4/1996 | Liu | B25H 3/00 | 224/904 |
| 5,836,446 | A * | 11/1998 | Varnom | B25H 3/026 | 211/70.6 |
| 5,924,568 | A * | 7/1999 | Zajonc | B25H 3/026 | 206/372 |
| 6,105,768 | A * | 8/2000 | Brown | B25H 3/025 | 211/70.6 |
| 6,360,891 | B1 * | 3/2002 | Rideout | F21V 21/0885 | 206/372 |
| 6,405,865 | B1 * | 6/2002 | Lin | B25G 1/085 | 206/374 |
| 6,547,074 | B1 * | 4/2003 | Chen | B25H 3/003 | 206/743 |
| 6,901,681 | B2 * | 6/2005 | Bueno | E04D 15/025 | 33/646 |
| 7,168,559 | B2 * | 1/2007 | Chen | B25H 3/003 | 206/379 |
| 7,478,500 | B1 * | 1/2009 | Pollock | A01K 97/06 | 206/315.11 |
| 7,513,364 | B2 * | 4/2009 | Tsai | E05B 65/5276 | 206/372 |
| 7,530,459 | B2 * | 5/2009 | Yeh | B25H 3/02 | 312/902 |
| 7,624,863 | B2 * | 12/2009 | Meng | B25H 3/003 | 206/349 |
| 7,661,526 | B2 * | 2/2010 | Lin | B25H 3/003 | 206/759 |
| 7,780,017 | B2 * | 8/2010 | Nguy | B25H 3/025 | 211/70.6 |
| 7,954,650 | B1 * | 6/2011 | Malik | B25H 3/04 | 211/70.6 |
| 8,157,092 | B2 * | 4/2012 | Christopher | B25G 1/085 | 206/349 |
| 8,302,771 | B2 * | 11/2012 | Arslan | B25H 3/003 | 206/759 |
| 8,469,190 | B1 * | 6/2013 | Chang | B25H 3/003 | 206/375 |
| D792,103 | S * | 7/2017 | Bishop | D3/315 | |
| 9,956,816 | B2 * | 5/2018 | Lacy | A46B 15/0095 | |
| 10,525,583 | B2 * | 1/2020 | Gorman | B25B 23/16 | |
| D874,828 | S * | 2/2020 | Feyereisen | D3/315 | |
| D890,458 | S * | 7/2020 | Yearwood, Jr. | D32/53 | |
| 2006/0016706 | A1 * | 1/2006 | Chen | B25H 3/003 | 206/379 |
| 2007/0095691 | A1 * | 5/2007 | Lin | B25G 1/085 | 206/378 |
| 2020/0269413 | A1 | 8/2020 | Fisher | | |

FOREIGN PATENT DOCUMENTS

| | | | |
|---|---|---|---|
| CN | 217801634 | U | 11/2022 |
| CN | 218613984 | U | 3/2023 |
| TW | M380208 | U | 5/2010 |
| TW | I722914 | B | 3/2021 |

* cited by examiner

TOOL STORAGE DEVICE

BACKGROUND OF THE INVENTION

The present invention relates to a storage device and, more particularly, to a tool storage device.

Sports of bicycles spread across the world in recent years, and each country is glad to see the booming development of the industry. However, the bicycles are of mechanical structures which, even though periodically maintained, cannot completely avoid sudden events. Therefore, events including malfunctioning of the bicycle frame, flat tire, tire leakage, or loosening of parts still occur during cycling. Repair through hand tools is generally required in these situations. However, the special tools are often heavy and, thus, difficult to be carried by the bicycles. Therefore, the industry often releases light tool combinations enabling users to handle sudden situations, such as malfunctioning of the bicycle frame, flat tire, tire leakage, or loosening of parts.

Taiwan Patent No. 1722914 discloses a tool set providing functions of disassembling and quick coupling of chains. The tool set includes a body, a tool unit having a first clamping member and a second clamping member. The body includes a positioning member. The tool unit is pivotably connected to an end of the body. The first clamping member is selectively coupled with the positioning member to position relative to the body. The second clamping member is disengageably connected to a side of the body and is disengageably and pivotably connected to an end of the body. Thus, the second clamping member can pivot relative to the body to cooperate with the first clamping member to thereby hold rollers of chains.

However, the tool set is generally carried by directly placing the tool set in a saddle bag or a backpack of another type. Anti-rust oil or lubricating oil is applied to the tool set to prevent rusting or maintain smooth operation. Furthermore, the tool set is apt to be contaminated by oil stain after use. Moreover, some tools have sharp surfaces, and tools in the form of screwdriver bits are apt to fall off. When the tool set is received in a saddle bag or a backpack, undesired situations may occur, such as the backpack tends to be contaminated by oil stain, the cloth of the saddle bag or the backpack could be damaged by the sharp surfaces or sharp ends of the tools, or the bits are lost.

In view of the shortcoming of the above conventional structure, the present inventor has designed a tool storage device to overcome the drawbacks of the conventional structure.

SUMMARY OF THE INVENTION

The primary objective of the present invention is to provide a tool storage receive comprising a container and a tool rack. The container includes a jar defining a first receiving portion therein and including a first opening intercommunicating the first receiving portion with the outside. The tool rack includes a base on an end thereof and a tool hanger rack on another end thereof. The base is disengageably mounted to the first opening. The tool hanger rack is received in the first receiving portion. When the base is disengaged from the first opening, the tool hanger rack is removable out of the first receiving portion.

In an example, the container includes a first closure cap configured to be in threading connection with an end of the jar and to close the first opening.

In an example, the first closure cap includes a first coupling portion and a first closure portion. The first closure cap is coupled with the jar by the first coupling portion and closes the first opening by the first closure portion.

In an example, the first closure cap includes a second receiving portion on a side thereof opposite to the jar and a second opening facing away from the jar and intercommunicating the second receiving portion with the outside. The container includes a second closure cap. The second closure cap is configured to be in threading connection with an end of the first closure cap opposite to the jar and closes the second opening.

In an example, the second closure cap includes an annular protrusion delimiting a patch receiving groove. When the second closure cap is coupled with the first closure cap, the annular protrusion is on a side of the second closure cap adjacent to the first closure cap. The container includes a patch cover configured to be in threading connection with the annular protrusion and to close the patch receiving groove.

In an example, the second closure cap includes a second coupling portion and a second closure portion. When the first closure cap disengages from the jar, the second closure cap is capable of coupling with the jar by the second coupling portion and closing the first opening by the second closure portion. The annular protrusion is located on a side of the second closure portion adjacent to the jar.

In an example, the first opening is circular in cross section and includes an inner periphery having a first width in a diametric direction. The base includes a flange on an outer periphery thereof. The flange includes a second width in the diametric direction of the first opening. The first width is smaller than the second width. The base is configured to couple with the first opening by insertion and to abut the flange against an end face on a side of the first opening opposite to the first receiving portion.

In an example, the base includes a receiving groove. The receiving groove is recessed from an end of the base opposite to the tool hanger rack and extends toward the tool hanger rack.

In an example, the end of the base opposite to the tool hanger rack includes a placing face which is planar and surrounds the receiving groove.

The present invention will become clearer in light of the following detailed description of illustrative embodiments of this invention described in connection with the drawings.

DETAILED DESCRIPTION OF THE INVENTION

Figure 1:
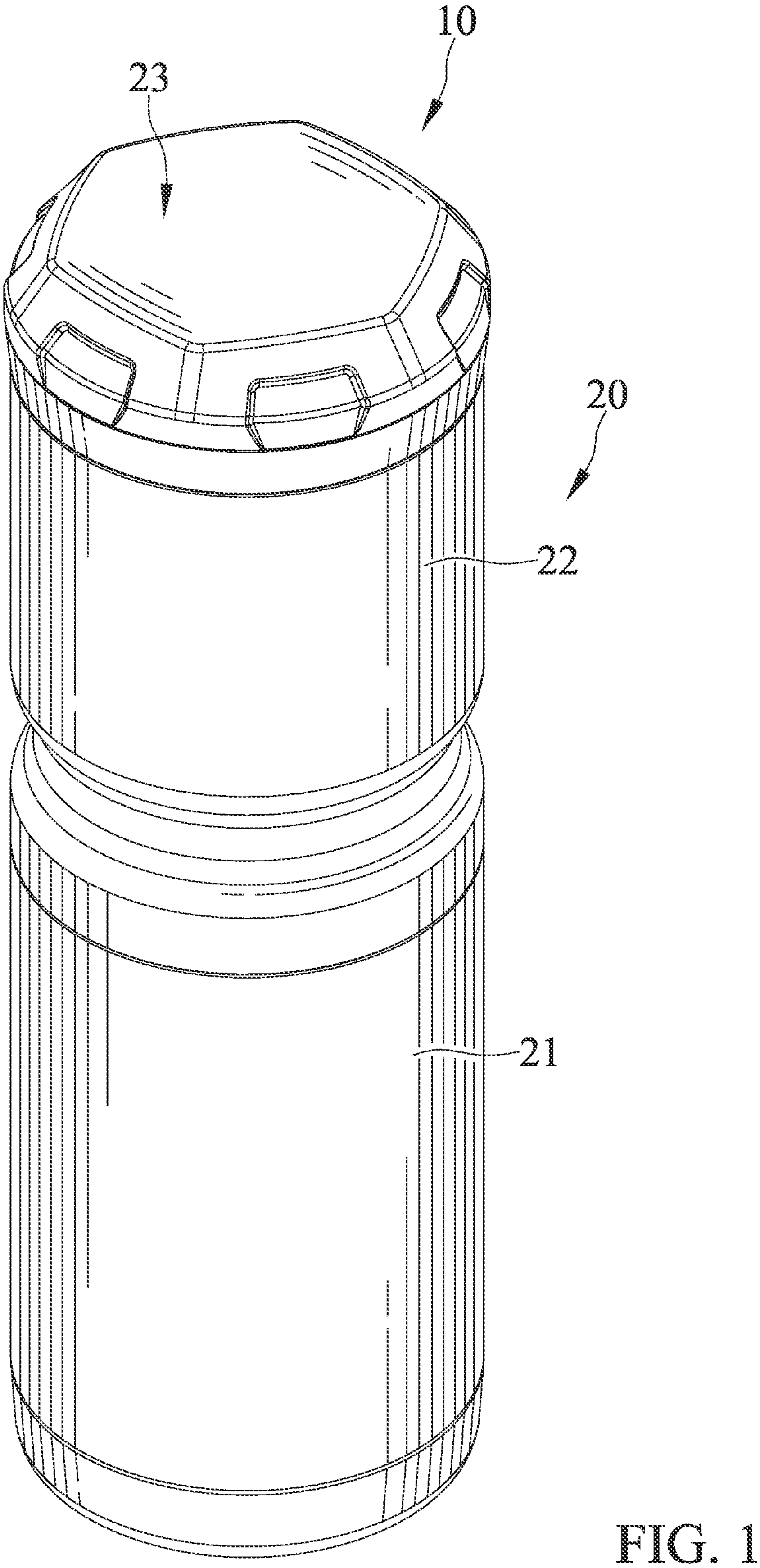
FIG. 1 is a perspective view of a tool storage device of an embodiment according to the present invention.
Figure 2:
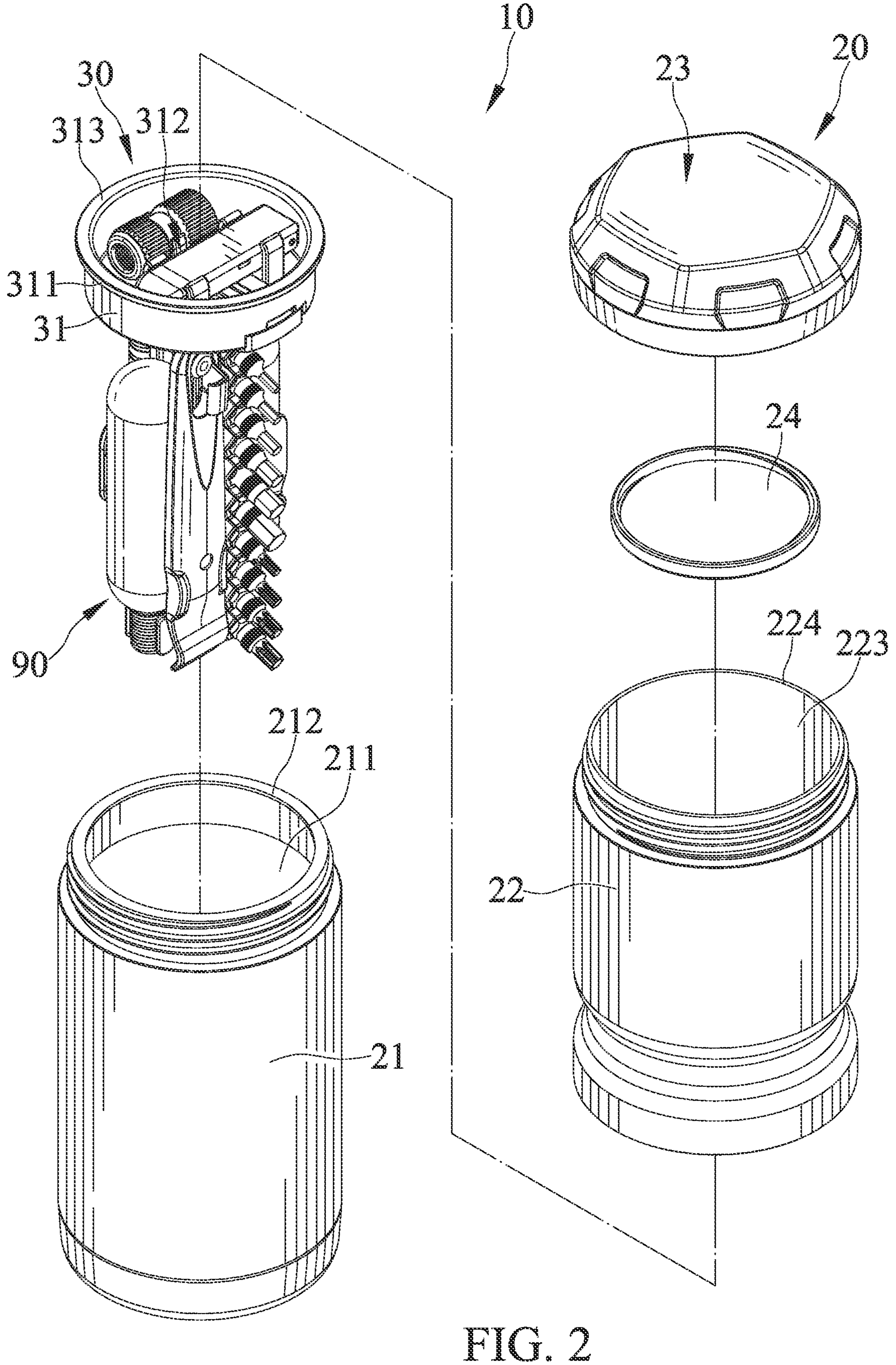
FIG. 2 is an exploded, perspective view of the tool storage device of the embodiment according to the present invention.
Figure 3:
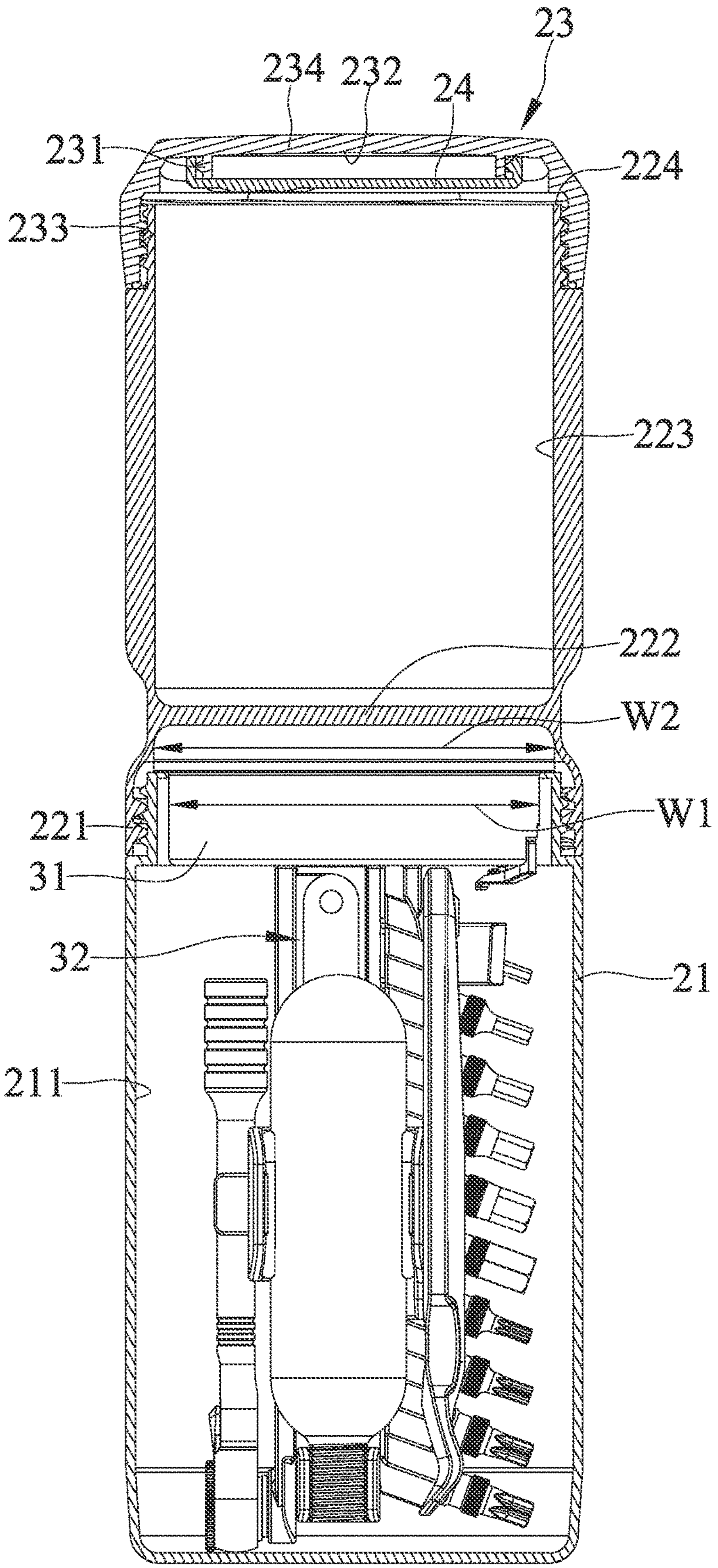
FIG. 3 is a cross sectional view of the tool storage device of the embodiment according to the present invention.

The techniques, measures, and effects of present invention will hereinafter set forth in detail by a preferred embodiment described in connection with the drawings. The description is provided for explanation only, and the application for patent shall not be restricted by such structure.

FIGS. 1-5 illustrate a perspective view, an exploded-perspective view, a cross sectional view and views illustrating use of a tool storage device 10 of an embodiment according to the present invention. The tool storage device 10 according to the present invention comprises a container 20 and a tool rack 30.

The container 20 includes a jar 21 defining a first receiving portion 211 therein and including a first opening 212 intercommunicating the first receiving portion 211 with the outside.

The tool rack 30 including a base 31 on an end thereof and a tool hanger rack 32 on another end thereof. The base 31 is disengageably mounted to the first opening 212. The tool hanger rack 32 is received in the first receiving portion 211. When the base 31 is disengaged from the first opening 212, the tool hanger rack 32 can be removed out of the first receiving portion 211.

The container 20 includes a first closure cap 22 configured to be in threading connection with an end of the jar 21 and to close the first opening 212.

The first closure cap 22 includes a first coupling portion 221 and a first closure portion 222. The first closure cap 22 is coupled with the jar 21 by the first coupling portion 221 and closes the first opening 212 by the first closure portion 222.

The first closure cap 22 includes a second receiving portion 223 on a side thereof opposite to the jar 21 and a second opening 224 facing away from the jar 21 and intercommunicating the second receiving portion 223 with the outside. The container includes a second closure cap 23. The second closure cap 23 is configured to be in threading connection with an end of the first closure cap 22 opposite to the jar 21 and closes the second opening 224.

The second closure cap 23 includes an annular protrusion 231 delimiting a patch receiving groove 232. When the second closure cap 23 is coupled with the first closure cap 22, the annular protrusion 231 is on a side of the second closure cap 23 adjacent to the first closure cap 22. The container 20 includes a patch cover 24 configured to be in threading connection with the annular protrusion 231 and to close the patch receiving groove 232.

The second closure cap 23 includes a second coupling portion 233 and a second closure portion 234. When the first closure cap 22 disengages from the jar 21, the second closure cap 23 is capable of coupling with the jar 21 by the second coupling portion 233 and closing the first opening 212 by the second closure portion 234. The annular protrusion 231 is located on a side of the second closure portion 234 adjacent to the jar 21.

The first opening 212 is circular in cross section and includes an inner periphery having a first width W1 in a diametric direction. The base 31 includes a flange 311 on an outer periphery thereof. The flange 311 includes a second width W2 in the diametric direction of the first opening 212. The first width W1 is smaller than the second width W2. The base 31 is configured to couple with the first opening 212 by insertion and to abut the flange 311 against an end face on a side of the first opening 212 opposite to the first receiving portion 211.

The base 31 includes a receiving groove 312. The receiving groove 312 is recessed from an end of the base 31 opposite to the tool hanger rack 32 and extends toward the tool hanger rack 32.

The end of the base 31 opposite to the tool hanger rack 32 includes a placing face 313 which is planar and surrounds the receiving groove 312.

Figure 4:
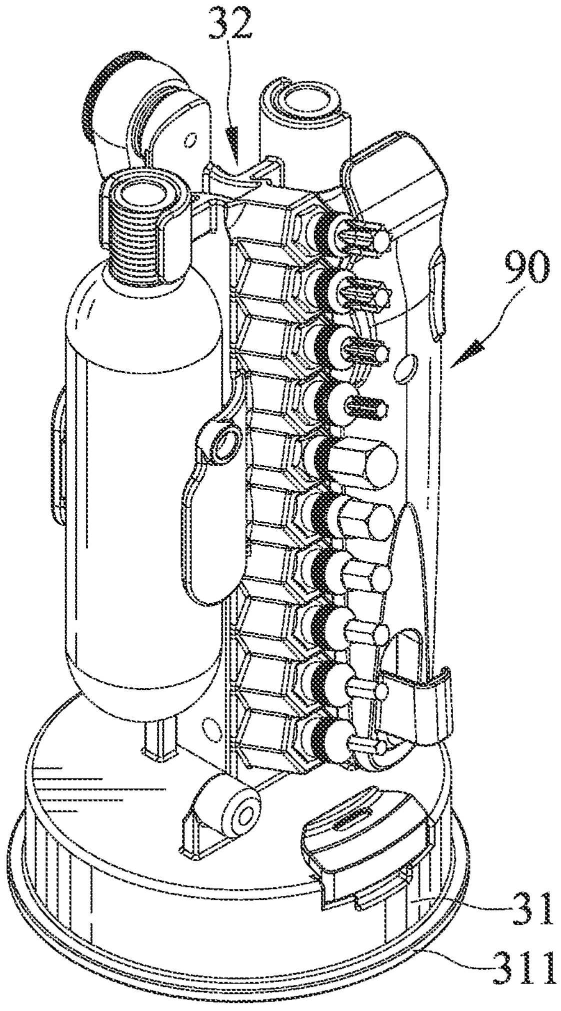
FIG. 4 is a perspective view illustrating use of a tool rack of the tool storage device according to the present invention in an upright state.
Figure 5:
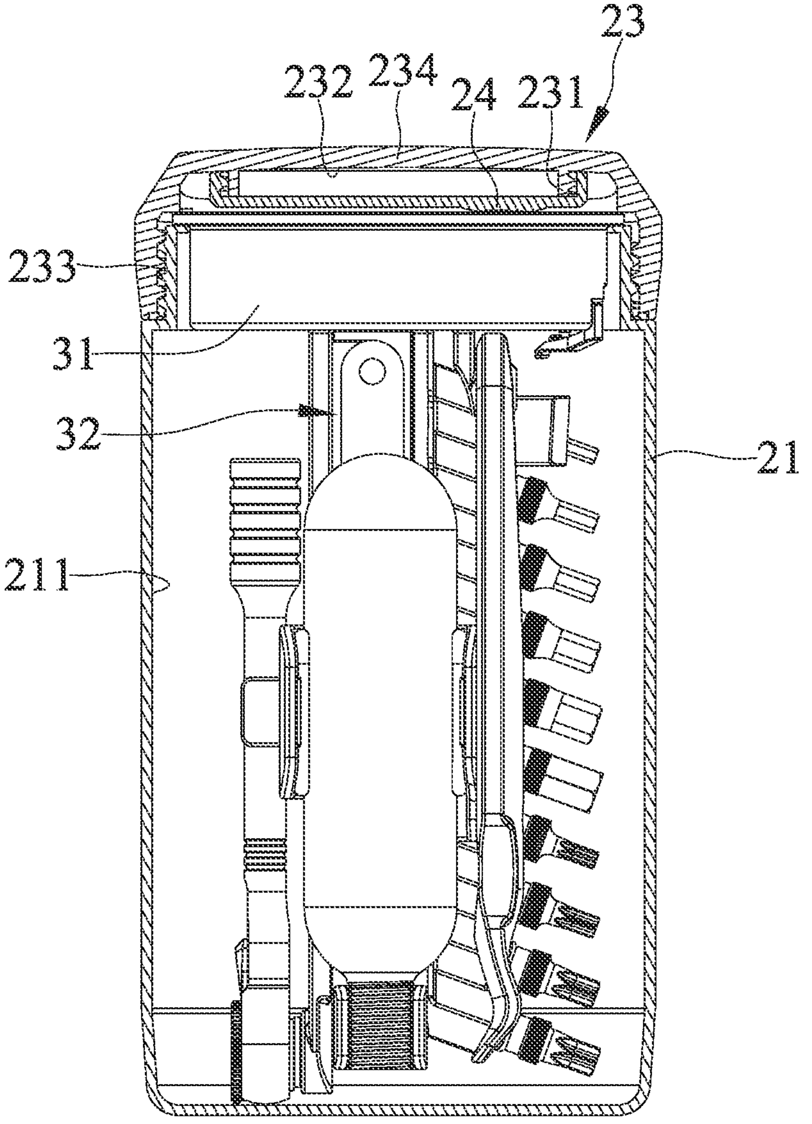
FIG. 5 is a cross sectional view illustrating coupling of a second closure cap and a container of the tool storage device according to the present invention.

By the above structure, the tool storage device 10 can receive tools properly. A tool set 90 is simply coupled with the tool hanger rack 32 through snapping. Thus, the tool storage device 10 can be used to receive the tool set 90 in the jar 21 having a fixed shape. This avoids the tool set 90 from disengaging from the tool hanger rack 32 due to collision or rubbing and also avoids a tool-carrying backpack from being contaminated by oil stain on the tool set 90. Furthermore, when it is desired to retrieve the tools from the tool storage device 10, the first closure cap 22 can be simply removed, and the jar 21 can be placed upside down on the ground or a table surface. Thus, the tool track 30 can be stand upright through support by the base 31, as shown in FIG. 4. Therefore, the tool storage device 10 permits easy retrieval of the tool rack 30 to allow a user to easily access the tools.

In summary, the tool storage device 10 including the above structure can properly receive tools.

Although specific embodiments have been illustrated and described, numerous modifications and variations are still possible without departing from the scope of the invention. The scope of the invention is limited by the accompanying claims.

The invention claimed is:

1. A tool storage device comprising:

a container comprising a jar defining a first receiving portion therein, a first opening intercommunicating the first receiving portion with an outside, and a first closure cap configured to be in threading connection with an end of the jar and to close the first opening, wherein the first closure cap comprises a first coupling portion and a first closure portion, wherein the first closure cap is coupled with the jar by the first coupling portion and closes the first opening by the first closure portion, wherein the first closure cap comprises a second receiving portion on a side thereof opposite to the jar and a second opening facing away from the jar and intercommunicating the second receiving portion with the outside, wherein the container further comprises a second closure cap, and wherein the second closure cap is configured to be in threading connection with an end of the first closure cap opposite to the jar and closes the second opening; and a tool rack comprising a base on an end thereof and a tool hanger rack on another end thereof, wherein the base is disengageably mounted to the first opening, wherein the tool hanger rack is received in the first receiving portion, and wherein when the base is disengaged from the first opening, the tool hanger rack is removable out of the first receiving portion.

2. The tool storage device as claimed in claim 1, wherein the second closure cap comprises an annular protrusion delimiting a patch receiving groove, wherein when the second closure cap is coupled with the first closure cap, the annular protrusion is on a side of the second closure cap adjacent to the first closure cap, and wherein the container comprises a patch cover configured to be in threading connection with the annular protrusion and to close the patch receiving groove.

3. The tool storage device as claimed in claim 2, wherein the second closure cap comprises a second coupling portion and a second closure portion, wherein when the first closure cap disengages from the jar, the second closure cap is capable of coupling with the jar by the second coupling portion and closing the first opening by the second closure portion, and wherein the annular protrusion is located on a side of the second closure portion adjacent to the jar.

4. The tool storage device as claimed in claim 1, wherein the first opening is circular in cross section and comprises an inner periphery having a first width in a diametric direction, wherein the base comprises a flange on an outer periphery thereof, wherein the flange comprises a second width in the diametric direction of the first opening, wherein the first width is smaller than the second width, wherein the base is configured to couple with the first opening by insertion and to abut the flange against an end face on a side of the first opening opposite to the first receiving portion.

5. The tool storage device as claimed in claim 4, wherein the base comprises a receiving groove, and wherein the receiving groove is recessed from an end of the base opposite to the tool hanger rack and extends toward the tool hanger rack.

6. The tool storage device as claimed in claim 5, wherein the end of the base opposite to the tool hanger rack comprises a placing face which is planar and surrounds the receiving groove.

* * * * *